United States Patent
Ono et al.

(10) Patent No.: US 6,949,301 B2
(45) Date of Patent: Sep. 27, 2005

(54) MAGNETIC RECORDING MEDIUM, THE MANUFACTURING METHOD AND MAGNETIC RECORDING APPARATUS USING THE SAME

(75) Inventors: Toshinori Ono, Odawara (JP); Yuuichi Kokaku, Yokohama (JP); Yoshinori Honda, Hiratsuka (JP); Shigehiko Fujimaki, Machida (JP); Tooru Yatsue, Goleta, CA (US)

(73) Assignee: Hitachi Global Storage Technologies Japan, Ltd., Odawara (JP)

(*) Notice: Subject to any disclaimer, the term of this patent is extended or adjusted under 35 U.S.C. 154(b) by 19 days.

(21) Appl. No.: 09/784,952

(22) Filed: Feb. 16, 2001

(65) Prior Publication Data

US 2002/0037440 A1 Mar. 28, 2002

(30) Foreign Application Priority Data

Sep. 28, 2000 (JP) .................................. 2000-300559

(51) Int. Cl.⁷ ............................................... G11B 5/725
(52) U.S. Cl. ........................ 428/694 TC; 428/694 TF; 428/695
(58) Field of Search ................... 428/457, 688, 428/694 TP, 694 TC, 694 TF, 695

(56) References Cited

U.S. PATENT DOCUMENTS

| | | | | |
|---|---|---|---|---|
| 5,637,373 A | * | 6/1997 | Hayashi et al. | 428/65.3 |
| 5,759,681 A | * | 6/1998 | Hosoe et al. | 428/332 |
| 5,858,536 A | * | 1/1999 | Yanagisawa | 428/408 |
| 5,958,542 A | * | 9/1999 | Ootake et al. | 428/65.3 |
| 5,962,117 A | * | 10/1999 | Furutani et al. | 428/219 |
| 6,001,479 A | * | 12/1999 | Yokosawa et al. | 428/408 |
| 6,096,694 A | * | 8/2000 | Tei et al. | 508/562 |
| 6,303,225 B1 | * | 10/2001 | Veerasamy | 428/408 |
| 6,329,037 B1 | * | 12/2001 | Kokaku et al. | 428/65.3 |
| 6,391,419 B1 | * | 5/2002 | Katayama et al. | 428/65.3 |
| 6,541,431 B1 | * | 4/2003 | Akada et al. | 508/427 |
| 6,706,363 B2 | * | 3/2004 | Honda et al. | 428/141 |
| 6,740,407 B1 | * | 5/2004 | Usuki et al. | 428/408 |

FOREIGN PATENT DOCUMENTS

| | | |
|---|---|---|
| JP | 62-150526 | 7/1987 |
| JP | 62-246129 | 10/1987 |
| JP | 63-2117 | 1/1988 |
| JP | 4-6624 | 1/1992 |
| JP | 4-90125 | 3/1992 |
| JP | 5-174354 | 7/1993 |
| JP | 5-174369 | 7/1993 |
| JP | 7-210850 | 8/1995 |
| JP | 8-180383 | 7/1996 |
| JP | 8-225791 | 9/1996 |
| JP | 9-030596 | 2/1997 |

OTHER PUBLICATIONS

"Terminal Attachment of Perfluorinated polymers to Solid Surfaces", Ruhe et al. Journal of Applied Polymer Science, 1994, vol. 53, pp 825–836.*

Ruhe, J., Blackman, G., Novotny, V., Clarke, T., Street, G., and Kuan, D., "Terminal Attachment of Perfluorinated Polymers to Soild Surfaces", J. App. Poly. Sci., 53(1994), 825–836.*

Rüthe, J., et al., "Terminal Attachment of Perfluorinated Polymers to Solid Surfaces", 1994, vol. 53 pp. 825–836, Journal of Applied Polymer Science.

* cited by examiner

*Primary Examiner*—Kevin M. Bernatz
(74) *Attorney, Agent, or Firm*—Kenyon & Kenyon

(57) ABSTRACT

This magnetic recording medium is characterized in that in the magnetic recording medium having a magnetic film on a non-magnetic substrate by intercalating at least an under layer, the proportion of functional groups per 100 carbon atoms in a diamond-like carbon protective coating mainly composed of carbon for protecting the magnetic film exceeds 20%. The bonding force between the protective coating layer and the lubricating layer of the magnetic recording medium is increased so that under high speed rotation, a decrease in the lubricating layer is not caused so as to provide a magnetic recording apparatus having high reliability.

8 Claims, 4 Drawing Sheets

FIG. 3

| | | THICKNESS OF PROTECTIVE LAYER (nm) | THE THICKNESS OF LUBRICANT LAYER IN THE EARLY STAGE (nm) | THE RATIO OF THE SURFACE FUNCTIONAL GROUP | L/UL EXAM RESULT | THE THICKNESS OF LUBRICANT LAYER AFTER THE EXAM (nm) |
|---|---|---|---|---|---|---|
| MAGNETIC RECORDING MEDIUM ACQUIRED BY EXAMPLE 1 | 1 | 3.0 | 2.2 | 32 | ○ | 2.1 |
| | 2 | 3.0 | 2.2 | 28 | ○ | 2.1 |
| | 3 | 3.0 | 2.2 | 26 | ○ | 2.1 |
| | 4 | 3.0 | 2.2 | 23 | ○ | 2.1 |
| | 5 | 3.0 | 2.2 | 38 | ○ | 2.1 |
| | 6 | 3.0 | 2.2 | 35 | ○ | 2.1 |
| | 7 | 3.0 | 2.2 | 30 | ○ | 2.1 |
| | 8 | 3.0 | 2.2 | 31 | ○ | 2.1 |
| | 9 | 3.0 | 2.2 | 29 | ○ | 2.1 |
| | 10 | 3.0 | 2.2 | 28 | ○ | 2.1 |
| MAGNETIC RECORDING MEDIUM ACQUIRED BY COMPARATIVE EXAMPLE | 11 | 3.0 | 2.2 | 15 | CRASH IN 1100 ROTATION | 0.8 |
| | 12 | 3.0 | 2.2 | 14 | CRASH IN 1200 ROTATION | 0.8 |
| | 13 | 3.0 | 2.2 | 18 | CRASH IN 1400 ROTATION | 1 |
| | 14 | 3.0 | 2.2 | 18 | CRASH IN 5000 ROTATION | 1.1 |
| | 15 | 3.0 | 2.2 | 20 | CRASH IN 8000 ROTATION | 1.2 |
| | 16 | 3.0 | 2.2 | 17 | CRASH IN 1600 ROTATION | 1 |
| | 17 | 3.0 | 2.2 | 15 | CRASH IN 1500 ROTATION | 1 |
| | 18 | 3.0 | 2.2 | 16 | CRASH IN 1400 ROTATION | 0.8 |
| | 19 | 3.0 | 2.2 | 19 | CRASH IN 3000 ROTATION | 0.8 |
| | 20 | 3.0 | 2.2 | 19 | CRASH IN 4200 ROTATION | 0.8 |

MAGNETIC RECORDING MEDIUM, THE MANUFACTURING METHOD AND MAGNETIC RECORDING APPARATUS USING THE SAME

BACKGROUND OF THE INVENTION

This invention relates to a magnetic recording medium which has excellent reliability and in which magnetic recording is performed with high density, a manufacturing method thereof and a magnetic disc device used in an auxiliary storage apparatus of a computer.

A magnetic disc apparatus used in a storage apparatus of a large-scale computer, a work station, a personal computer and the like has been yearly increased in its importance and developed into a mass-stored and small sized device. Increasing of recording density is essential to the development of the magnetic disc apparatus into mass-stored and small-sized apparatus. As the technology for realizing the development into the mass-stored and small-sized device, cited is reduction in distance between a magnetic recording layer of a magnetic recording medium and a magnetic head.

The magnetic recording medium manufactured by sputtering has been provided with a protective coating heretofore for the purpose of protecting a magnetic film from sliding of a magnetic head. Thinning of the protective coating and reduction of distance between the surface of the protective coating and the magnetic head are the most effective means for more decreasing the distance between a magnetic recording layer and the magnetic head. For this protective coating, carbon manufactured by DC sputtering, RF sputtering (Japanese Patent Laid Open Hei 5-174369), or CVD (Japanese Patent Laid-Open No. Hei 4-90125) is most generally used, and a method of mixing nitrogen atoms, hydrogen atoms and the like in the film to obtain a protective coating more excellent in strength (Japanese Patent Laid-Open No. Sho 62-246129) has been generally adopted. Further, it is general to use perfluoropolyether liquid lubricant for the purpose of reducing friction between the magnetic head and the magnetic recording medium.

As a general method for thinning, cited is to apply diamond-like carbon (DLC) using ion beam deposition (IBD) or chemical vapor deposition (CVD). for a protective coating. DLC, however, bonding strength of carbon atoms and hydrogen atoms in the thin film is generally strong and also its network has higher continuity as compared with the carbon protective coating provided by the sputtering. Therefore, the problem is that the bonding strength to perfluoropolyether lubricant applied to the protective coating is weak owing to fewer functional groups.

One of performance indexes of the magnetic recording device using the magnetic recording medium is the data transfer rate. The data transfer rate largely depends on the data access time. The access time is composed of the seek time and the rotation waiting time, and to shorten the rotation waiting time by increasing the rotating speed of a magnetic recording medium leads to the improvement in the data transfer rate.

When the rotating speed of the magnetic recording medium is increased, however, centrifugal force is applied to the liquid lubricant on the DLC protective coating of the magnetic recording medium so that as the result of the problem that the bonding strength is weak, the liquid lubricant is driven away toward the outer peripheral part of the magnetic recording medium until it is shaken off from the magnetic recording medium (hereinafter referred to as spin-off). Consequently, the problem encountered is that the lubricant on the magnetic recording medium is decreased to increase the frictional force between the magnetic recording medium and the magnetic head and cause a crash.

In order to solve the problems, attempts have been made to apply surface treatment to the protective coating so as to increase the bonding strength. Japanese Patent Laid-Open No. Sho 62-150526 and Japanese Patent Laid-Open No. Sho 63-2117 disclose that the surface is subjected to plasma treatment. Japanese Patent Laid-Open No. Hei 4-6624 discloses that the surface is subjected to ultraviolet treatment, water treatment, ozonization or the like. Further, Japanese Patent Laid-Open No. Sho 63-2117, Japanese Patent Laid-Open No. Hei 9-30596, Japanese Patent Laid-Open No. Hei 8-225791, Japanese Patent Laid-Open No. Hei 7-210850 and Japanese Patent Laid-Open No. Hei 5-174354 are similar to the above, and all of these disclose that after the protective layer is formed, the surface thereof is subjected to some treatment. These methods, however, have the problem that it is difficult to uniformly treat the whole surface, one additional process is needed in the work, and besides the adhesion of the lubricant is insufficient.

SUMMARY OF THE INVENTION

The present invention has been made in view of the above circumstances and provides a magnetic recording medium which is increased in the chemical bonding strength of a protective coating layer and liquid lubricant not to cause a decrease in liquid lubricant due to spin-off under high speed rotation.

Further, the invention provides a manufacturing method for the above magnetic recording medium.

Further, the invention provides a magnetic storage apparatus suitable for reconciling high speed rotation and high reliability by using the above magnetic recording medium.

To solve the above problems, the invention mainly adopts the following constitution.

According to the invention, a magnetic recording medium is characterized in that the magnetic recording medium has a magnetic film formed on a non-magnetic substrate by intercalating at least an under layer and the proportion of functional groups per 100 carbon atoms in the diamond-like carbon protective coating mainly composed of carbon, which protects the magnetic film, exceeds 20%.

In the case where a lubricating film of perfluoropolyether having at least one functional group is provided on the protective coating, bonding performance between the protective coating and the lubricating film is excellent.

According to the invention, a manufacturing method for the magnetic recording medium is characterized in that in the manufacturing method for the magnetic recording medium having a magnetic film formed on a non-magnetic substrate by intercalating at least an under layer, when a protective coating mainly composed of carbon for protecting the magnetic film is formed by an ion beam method or a chemical vapor deposition method, at least one gas among $CO_2$, $NO_2$, $N_2O$ is added.

In the case where the protective coating is diamond-like carbon, the bonding performance between the protective coating and the lubricating film is especially improved.

In the case of forming the protective coating by the ion beam method or the chemical vapor deposition method, it is preferable to use at least one of $N_2$, Ne, Ar, Kr and Xe and hydrocarbon gas or hydrocarbon gas.

In the manufacturing method for the magnetic recording medium having a magnetic film formed on a non-magnetic substrate by intercalating at least an under layer, at the time of forming a diamond-like carbon protective coating mainly composed of carbon for protecting the magnetic film by an ion beam method or a chemical vapor deposition method, one gas among $CO_2$, $NO_2$, $N_2O$ may be added.

According to the invention, a magnetic storage device is characterized that the device includes the magnetic recording medium, a driving part for driving the magnetic recording medium, a magnetic head having a recording part and a reproducing part, a recording reproducing signal processing part for giving and receiving a signal to and from the magnetic head, and a magnetoresistive head as a reproducing part of the magnetic head.

BRIEF DESCRIPTION OF THE DRAWINGS

Preferred embodiments of the present invention will be described in detail based on the followings, wherein

FIG. 3 is a diagram showing the comparison of performance between the magnetic recording media provided according to the embodiment and the comparative example of the invention;

DESCRIPTION OF THE PREFERRED EMBODIMENTS

Figure 1:
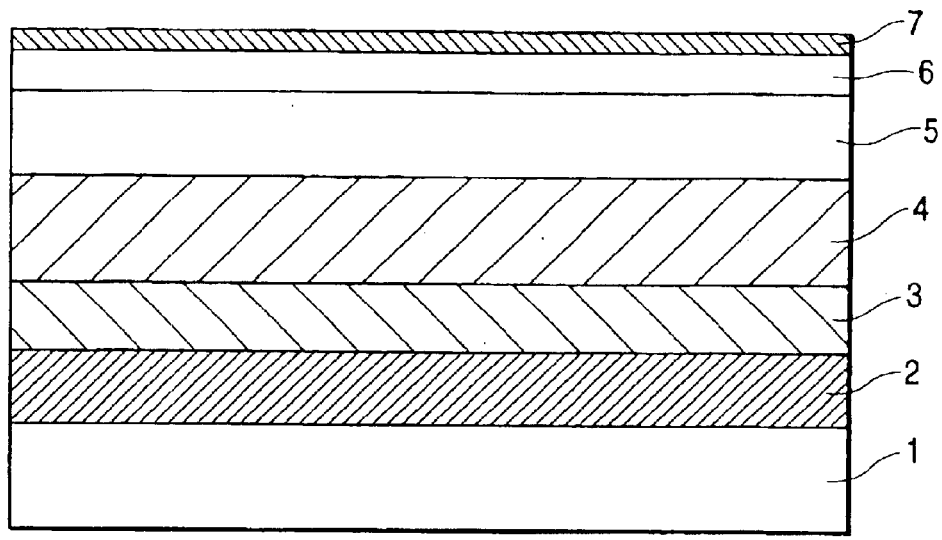
FIG. 1 is a typical sectional view of a magnetic recording medium according to the embodiment of the invention.

First, the function, constitution and operation of the invention will be described in brief in the following. In the manufacturing method for the magnetic recording medium having a magnetic film, a protective coating mainly composed of carbon for protecting the magnetic film and a lubricating film of perfluoropolyether having at least one functional group provided on a substrate, at the time of forming the protective coating by an ion beam method using at least one of $N_2$, Ne, Ar, Kr, Xe and hydrocarbon gas, or only the hydrocarbon gas or a CVD method, the bonding performance between the protective coating and the lubricating film is improved by adding at least one gas among $CO_2$, $NO_2$, $N_2O$.

In the magnetic recording medium provided by the above method, the proportion of functional groups per 100 carbon atoms in the protective coating can be over 20%.

The magnetic storage apparatus of the invention includes the magnetic recording medium, a driving part for driving the magnetic recording medium, a magnetic head formed by a recording part and a reproducing part, a unit for moving the magnetic head relatively to the magnetic recording medium, a signal input unit for inputting a signal to the magnetic head and a recording reproducing signal processing unit for reproducing an output signal from the magnetic head, wherein the reproducing part of the magnetic head is formed by a magnetoresistive head, and the magnetic recording medium is formed by the magnetic recording medium including the protective coating having the above characteristic quality, hardness and thickness.

Further, the magnetoresistive sensor part of the magnetoresistive head is formed between two shield layers which are spaced from each other at a distance of 0.2 μm or less and made of soft magnetic substance, and the product Br×t of the thickness (t) of the magnetic layer of the thus constructed magnetic recording medium and the residual flux density Br measured by applying a magnetic field in the relative traveling direction of the magnetic head to the magnetic recording medium in recording ranges from 3.2 mA (40 gauss micron) to 9.6 mA (120 gauss micron) both inclusive.

The reason why the magnetoresistive sensor part of the magnetoresistive head is to be formed between two shield layers which are spaced from each other at a distance of 0.2 μm or less and made of soft magnetic substance is that in the magnetic storage apparatus having the maximum track recording density of 220 kFCI, sufficient reproducing output cannot be obtained. The *distance between two shield layers made of soft magnetic substance is preferably 0.12 μm or more in view of working easiness.

The reason why the product Br×t of the thickness (t) of the magnetic layer of the thus constructed magnetic recording medium and the residual flux density Br measured by applying a magnetic field in the relative traveling direction of the magnetic head to the magnetic recording medium in recording ranges from 3.2 mA (40 gauss micron) to 9.6 mA (120 gauss micron) both inclusive is that when the Br×t is 3.2 mA (40 gauss micron), the risk of reproducing wrong information becomes higher due to lowering of reproducing output caused by being left for long time after recording, and when it exceeds 9.6 mA (120 gauss micron), it becomes difficult to overwrite in recording.

Further, by forming at least two layers of under layers in the magnetic recording medium, the crystal orientation of the magnetic layer may be controlled. By forming such multiple under layer, the influence of atomic diffusion from the under layer to the magnetic layer can be remarkably reduced, and simultaneously the crystallinity of the under layer close to the magnetic layer can be improved, and the adhesion between the magnetic layer and the under layer becomes strong so as to obtain high sliding resisting performance. Further, since the surface of the under layer close to the magnetic layer has no atomic periodic array extending over a long distance, the crystal grains of the magnetic layer formed thereon may be refined and also the crystal orientation may be controlled. Thus, the mean particle diameter of crystal constituting the magnetic layer is controlled to 15 nm or less suitable for reduction of noise, very fine size, and simultaneously the direction of the axis of easy magnetization may be controlled to be parallel to the film surface suitable for in-plane magnetic recording.

The magnetoresistive head used in the magnetic storage apparatus of the invention is formed by a magnetoresistive sensor including plural conductive magnetic layers causing a large resistance change due to a relative change of mutual magnetizing directions by an external magnetic field, and a conductive non-magnetic layer disposed between the conductive magnetic layers. The reason why the thus constructed reproducing head is used is that a signal recorded at the maximum track recording density exceeding 300 kFCI is stably reproduced to obtain signal output.

Further, the magnetoresistive head is formed on a magnetic head slider, in which the area of the floating surface rail is equal to or smaller than 1.00 $mm^2$ and the mass is equal to or less than 2 mg to achieve the invention. The reason why the area of the floating surface rail is equal to or smaller than 1.00 $mm^2$ is that the probability of colliding with the projection is reduced, and simultaneously, the shock resistance reliability can be improved by setting the mass equal to or less than 2 mg. Thus, the recording density of 50 giga-bit per 1 $in^2$ and high shock resistance may be consistent with each other.

The embodiments of the invention will now be described in detail. FIG. 1 shows one embodiment of the invention.

<Embodiment 1>

First, a soda lime glass substrate 1 (outside diameter of 84 mm, inside diameter of 25 mm and thickness of 1.1 mm) to be used is sufficiently washed. This substrate is introduced into a vacuum vessel evacuated to about 5.3×10E (−5)Pa (4.0×10E (−7)Torr). First, it is transported to a first seed layer forming chamber to form a first seed layer 2 of Ni-25 at. % Cr-15 at. % Zr with a thickness of 20 nm under the condition of Ar atmosphere about 0.8 Pa (6 mTorr) by the DC magnetron sputtering method. Subsequently, it is transported to a second seed layer forming chamber to form a second seed layer 3 of Co-40 at. % Cr-5 at. % Zr with a thickness of 50 nm under the condition of Ar atmosphere about 0.8 Pa (6 mTorr) by the DC magnetron sputtering method. Subsequently, it is transported to a heating chamber in the vacuum layer to heat the substrate to the substrate temperature 260° C. by an infrared heater.

Subsequently, it is transported to an under layer forming chamber to form an alloy under layer 4 of Cr-10 at. % Mo-7.5 at. % Ti with a thickness of 30 nm under the condition of Ar atmosphere about 0.8 Pa (6 mTorr) by the DC magnetron sputtering method. Subsequently, it is transported to a magnetic recording layer forming chamber to form an alloy layer 5 (to form a magnetic layer) of Co-20 at. % Cr-4 at. % Ta-8 at. % Pt with a thickness of 22 nm under the condition of Ar atmosphere about 0.9 Pa (7 mTorr) by DC magnetron sputtering method. By using the substrate where the alloy under layer 4 of Cr-10 at. % Mo-7.5 at. % Ti and the alloy layer 5 of Co-20 at. % Cr-4 at. % Ta-8 at. % Pt are formed, the protective coating layer which is mentioned later and mainly composed of carbon according to the invention is formed.

As the substrate 1, in addition to the soda lime glass, used is a non-magnetic rigid substrate formed of chemical reinforced aluminosilicate, an Al—Mg alloy electroless-plated with Ni—P, silicon, ceramics made of borosilicate glass or the like, or ceramics subjected to glass glazing or the like.

As the first and second seed layers are provided for avoiding electrochemical precipitation of alkali metal from the soda lime glass, they may have an arbitrary thickness, and one layer will do. Further, if not needed, it may be omitted. The under layer 4 is used as a under film for controlling the crystal orientation of a magnetic layer formed thereon. As the under layer, used is a thin film of a Cr-group alloy such as non-magnetic Cr—V, Cr—Ti, Cr—Mo, Cr—Si, Cr—Mo—Ti alloy forming an irregular solid solution which has good crystal consistency with the magnetic film and may be (100) orientated. When simultaneously 0.5 vol. % to 50 vol. % nitrogen is added to the gas for discharge used in sputtering to form the under layer, the crystal grains of the under layer are refined. As a result, the crystal grains of the continuously formed magnetic layer are also refined so that medium noise can be reduced.

As the magnetic layer 5, not only Co—Cr—Pt—Ta alloy, but a multi-alloy family material in which Co is taken as principal component, Pt is contained to increase the coercive force, and further Cr, Ta, $SiO_2$, Nb and the like to reduce medium noise are added may be used. Especially, when Ta, Nb, V, and Ti are added, the melting point of a target is lowered, and composition separation of the magnetic film containing Cr is easy to progress. This is favorable.

In the Co-group alloy family material to which Pt, Ni or Mn is added, lowering of magnetic anisotropic energy is less than that in the case of other additive elements, so it is practical. To be concrete, in addition to Co—Cr—Pt, used are alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$ and the like.

Concerning the composition of a Co alloy layer occupying a ferromagnetic portion, it is considered that the solid solution limit of Cr is 5 to 10 at. %, and the solid solution limit of Ta is about 2 at. %, and a Co alloy magnetic layer is formed exceeding these solid solution limits, whereby the magnetic separation in the magnetic layer progresses to reduce medium noise. As a practical composition, for example, the followings are used:

Co-20 at. % Cr-4 at. % Ta-8 at. % Pt alloy;
Co-22 at. % Cr-20 at. % Pt alloy;
Co-15 at. % Cr-8 at. % Pt-20 mol. % $SiO_2$ alloy;
Co-17 at. % Cr-12 at. % Pt-5 at. % Mn alloy;
Co-17 at. % Cr-5 at. % Nb-10 at. % Pt alloy;
Co-20 at. % Cr-5 at. % V-12 at. % Pt alloy;
Co-20 at. % Cr-10 at. % -15 at. % Pt alloy;
Co-15 at. % Cr-5 at. % Nb-5 at. % Ta-20 at. % Pt alloy.

Figure 2:
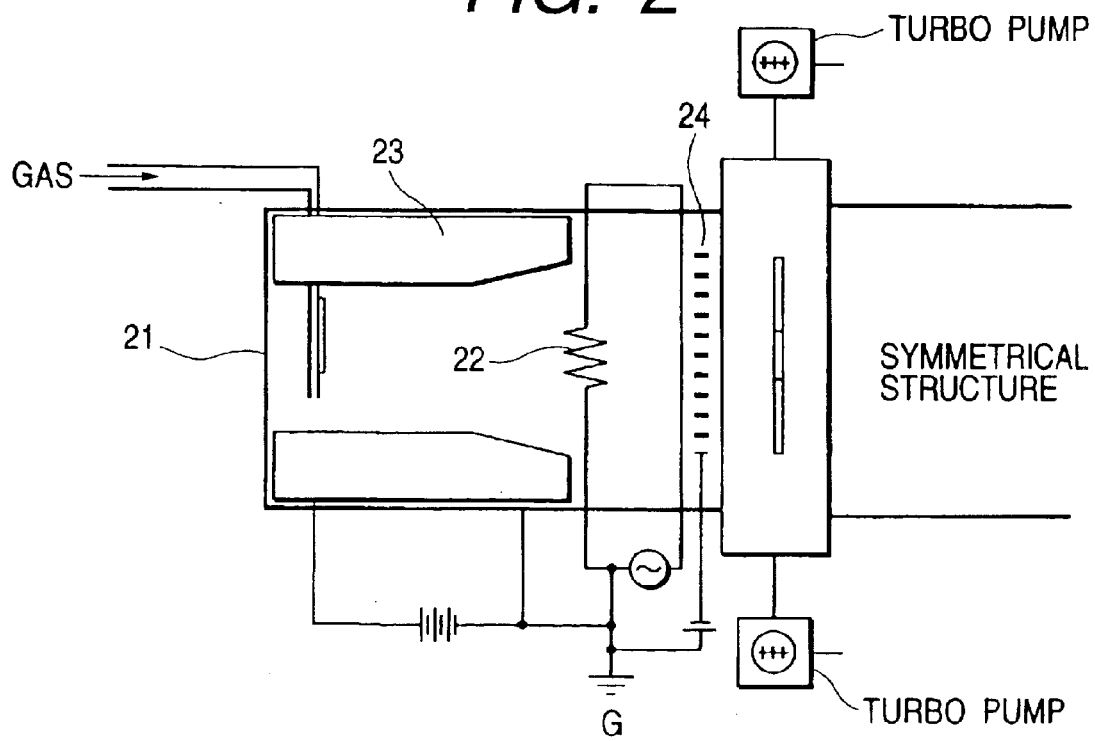
FIG. 2 is a schematic diagram of a protective coating forming chamber 21.

The above substrate is transported without being taken out from the vacuum vessel to a protective coating layer forming chamber 21 shown in FIG. 2. The protective coating forming chamber 21 is formed by an ion gun including a heat filament 22, an anode 23 and a grid 24 disposed in front of the heat filament. While the protective coating forming chamber 21 is evacuated by a turbo-molecular pump, from the rear of the anode, 15 sccm (Standard Cubic centimeter per minutes) of Ar gas, 50 sccm of ethylene ($C_2H_4$) gas, further 20 sccm of carbon dioxide ($CO_2$) gas, 10 sccm of nitrogen dioxide ($NO_2$) gas and 10 sccm of laughing gas ($N_2O$) are introduced through a mass flow controller. At this time, the pressure is about 0.5 Pa(4 mTorr) at the baratron gauge.

Subsequently, 30A is applied to the heat filament of the ion guns positioned on both sides of the substrate, DC +100V is applied to the anode to induce plasma, and then −530V is applied to the grid to derive ions. Further, pulse bias with −100V and 3 kHz is applied to the substrate. At this time, the anode current is 500 mA, and the bias current of the substrate is 50 mA. By this ion beam deposition method (IBD), a DLC protective coating layer 6 mainly composed of carbon and hydrogen is formed 3 nm thick on the Co—Cr—Ta—Pt alloy layer 5. The deposition rate of coating at this time is 1.0 nm/s.

By the above method, plural discs are manufactured, some of them are subjected to thin film analysis, and the other are provided with a lubricant layer 7 of fluorocarbon family. The thickness of the layer is 2.2 nm measured by quantitative analysis using Fourier-Transform InfraRed spectroscopic analyzer (FT-IR). After that, floating check is performed to make a sliding test in a single plate, or the disc is built in the magnetic disc apparatus to make a reliability test.

The protective coating of the disc manufactured by the above method is analyzed by the following methods to measure the proportion of functional groups of the protective coating surface. That is, ESCA (Electron Spectroscopy for Chemical Analysis) is used for identifying the covering rate of the functional groups of the protective coating surface. Direct identification of —COOH, —C═O, —COH, —CNH$_2$ which are surface functional groups, using ESCA is difficult in view of sensitivity and measurement accuracy. The above problems have been overcome by the tag modification method described in the following.

That is, the covering rate identification is performed by modification (tag modification) using molecules which have functional groups interacting with the protective coating surface functional groups quantitatively and irreversibly by molecular recognition, and contain fluorine atoms which have high sensitivity coefficient to ESCA.

To be concrete,

To identify —COOH functional group, the protective coat surface is dipped in a benzene solution of pentafluorophenyl bromide for one hour to modify —COOH functional group with fluorine molecules.

To identify —C=O functional group, the protective coating surface is dipped in an ethanol solution of pentafluorophenylhydrazine for one hour to modify —C=O functional group with fluorine molecules.

To identify —COH functional group, the protective coating surface is dipped in an ethanol solution of perfluorooctyldimethylchlorosilane to modify —COH functional group with fluorine molecules.

To identify —CNH$_2$ functional group, the protective coating surface is dipped in a chloroform solution of pentafluorobenzoylchloride for one hour to modify —CNH$_2$ functional group with fluorine molecules.

The respective protective coating surface tag-modified by one hour reaction at room temperature are dipped in the respective solvents to remove unreacted material from the protective coating surface.

In identifying the functional group covering rate of the protective coating surface, each tag-modified protective coating surface is obtained at an angle 24° of analysis of ESCA by Cls and Fls measurement intensity ratio, and as a result, the proportion of the functional groups —COOH, —C=O, —COH, —CNH$_2$ per 100 carbon atoms is about 30% on the average in total.

On the other hand, the disc provided with a lubricant is attached on an evaluating apparatus having a head load/unload mechanism to make a test. When load/unload test on ten discs are made 50000 times at a rotating speed of 15000 r.p.m, tests on all of ten discs are ended without crash. Further, when the thickness of the lubricating layer of the tested disc is measured by FT-IR, it is confirmed that the thickness is hardly decreased, 2.1 nm. As a result, it is proved that the magnetic recording medium of the invention has reinforced bonding force to the lubricant so that a decrease in lubricant due to spin-off is small, and even in the case where the thickness of the protective coating is very thin, 3 nm, sliding resisting reliability is sufficient. The above evaluation result is described as sample No. 1 in FIG. 3.

COMPARATIVE EXAMPLE

Sample No. 2 is manufactured by the substantially same method as that of the embodiment 1 except that 10 sccm of carbon dioxide (CO$_2$) gas and nitrogen oxide (NO$_2$) gas and dinitrogen monoxide are not added at the time of forming the protective coating layer 6. The thickness of the protective coating layer 6 is 3 nm which is the same as that of the embodiment 1, and similarly the thickness of the lubricating layer 7 is 2.2 nm. The thus manufactured disc is evaluated by the same method as that of the embodiment 1.

As a result, in the tag modification analysis, the proportion of the surface functional group is 13%. When load/unload test is made on ten discs at the rotating speed of 15000 r.p.m, all of the discs cause crash during the time from 1000 times to 8000 times. When the thickness of the lubricating layer is measured on ten discs by FT-IR, it is confirmed that the thickness is decreased to 0.7 to 1.2 nm as compared with that before the test.

As a result, it is known that in the magnetic recording medium obtained by the manufacturing method of the comparative example, the bonding force between the protective coating layer and the lubricating layer is not enough so that the lubricating layer is scattered and decreased due to high speed rotation, and the frictional force between the magnetic recording medium and the magnetic head is increased to cause crash.

<Embodiment 2>

When 5,0000 times load/unload tests are executed on the disc described in the embodiment 1, in all of the magnetic recording medium taking the thickness of the magnetic film to be 15 nm, 17 nm and 21 nm, the magnetic recording media and the magnetic head are not broken down, so favorable sliding resistance reliability is obtained.

By decreasing the thickness of the magnetic layer, the product Br×t of the thickness (t) of the magnetic layer and the residual magnetic flux density Br is largely decreased. The in-plane coercive force Hc approximately ranges from 176 kA/m to 256 kA/m, the coercivity squareness S* is from 0.74 to 0.65, about 0.7, and the remanence squareness is 0.78 to 0.7 (the remanence squareness S is the ratio of the residual flux density to the saturated flux density). These magnetic characteristics are measured at 25° C. by a sample vibration type magnetometer.

The electromagnetic transducing characteristics of these magnetic recording medium are measured by using a magnetic head constructed so that the shield gap length Gs of the magnetoresistive reproducing element (MR element) is 0.12 $\mu$m and the gap length of the write element is 0.2 $\mu$m. The sense current of the MR element is set to 3 mA, and the write current I is set to 41 mA. The floating height of the head is varied by changing the rotating seed of the magnetic recording medium (magnetic disc medium) to measure the output half width PW 50 of a solitary reproduced wave by a digital oscilloscope (Tektronix TDS 544).

The thinner the magnetic film is, and the lower the floating height of the magnetic head is, the smaller the PW 50 is. In the case where the thickness of the magnetic film is 15 nm and the floating height of the head is 25 nm, a small value, 240 nm is obtained. The output at the maximum track recording density of 360 kFCI measured by the spectral analyzer is 1 to 2% of the output of a solitary reproduced wave at 10 kFCI measured by the digital oscilloscope. The output at the maximum track recording density of 360 kFCI measured by the spectral analyzer is integrated and obtained until it exceeds the output of waveform of the odd order by 100 MHz.

Further, the ratio SLF/Nd of the integrated medium noise (Nd) in the case where 0-p output (SLF) of the solitary reproduced wave and a signal of 360 kFCI are recorded is evaluated. The floating height of the head is taken as 25 nm, and Nd is taken as the integrated value of noise of a band corresponding to from 0.5 kFCI to 540 kFCI. In all of media, a high SLF/Nd ratio above 24 dB is obtained at the high recording density as much as 360 kFCI.

Figure 4:
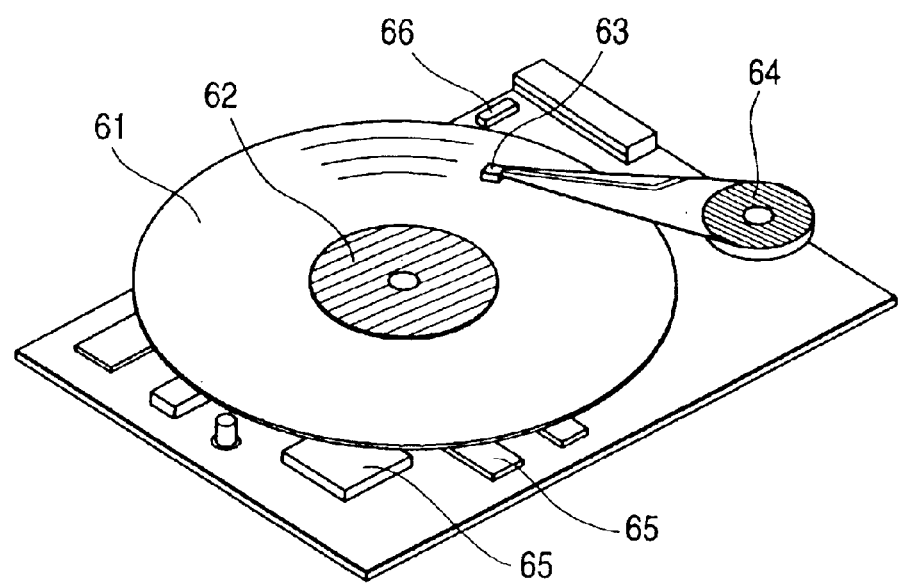
FIG. 4 is a diagram showing the general construction of a magnetic storage device.

FIG. 4 shows the constitution of the magnetic storage apparatus including the magnetic disc medium 61, a driving part 62 for driving the magnetic recording medium, a magnetic head 63 formed by a recording part and a reproducing part, a unit 64 for moving the magnetic head relatively to the magnetic recording medium, a signal input unit for inputting a signal to the magnetic head, a recording reproducing signal processing unit 65 for reproducing an output signal from the magnetic head, and a part 66 serving as a refuge place at the time of loading and unloading the magnetic head.

Figure 5:
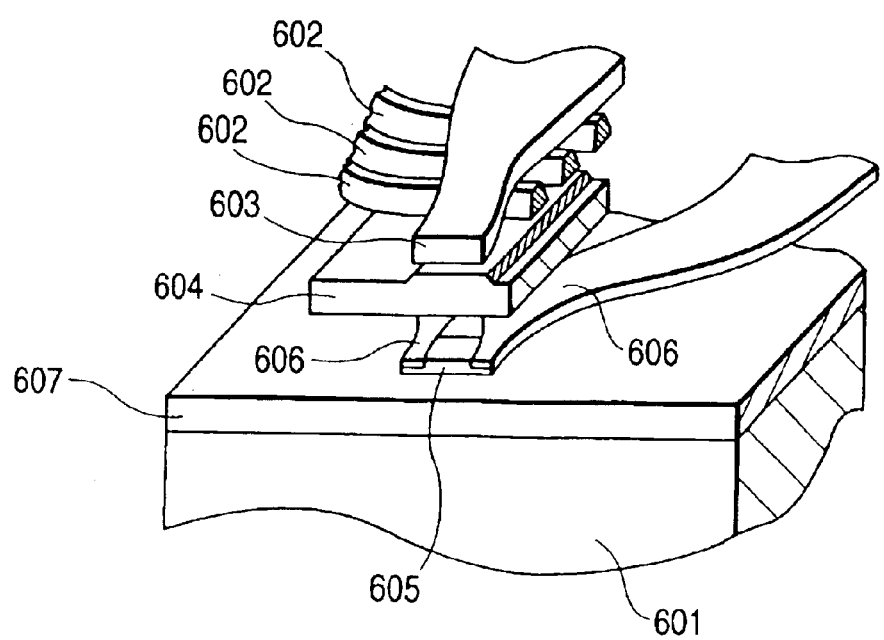
FIG. 5 is a typical perspective view of a magnetic head.
Figure 6:
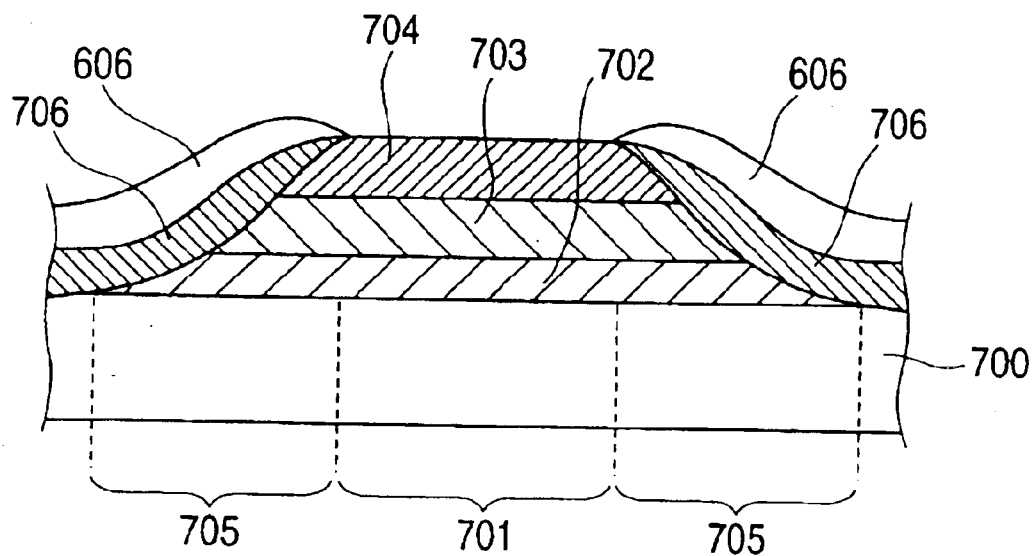
FIG. 6 is a diagram showing the sectional structure of a magnetoresistive sensor.

The reproducing part of the magnetic head is formed by a magnetoresistive head. FIG. 5 is a typical perspective view of the magnetic head used in measurement. The head is a composite head having both an electromagnetic induction type head for recording and a magnetoresistive head which are formed on a substrate 601. The recording head is formed by an upper recording magnetic pole 603 and a combined lower recording magnetic pole and upper shield layer 604 which sandwich coils 602, and the gap length between the recording magnetic poles is 0.3 $\mu$m. For the coil, copper 3 $\mu$m thick is used. The reproducing head is formed by a magnetoresistive sensor 605 and electrode patterns 606 at both ends thereof, the magnetoresistive sensor is sandwiched by the combined lower recording magnetic pole and upper shield layer 604 and a lower shield layer 607 which are 1 $\mu$m thick, and the distance between the shield layers is 0.20 $\mu$m. In FIG. 6, the gap layer between the recording magnetic pole, and the gap layer 608 between the shield layer and the magnetoresistive sensor 608 are omitted.

FIG. 6 shows the structure of the section of the magnetoresistive sensor. The signal detection area 701 of the magnetic sensor is formed by a portion where a lateral bias layer 702, a separation layer 703 and a magnetoresistive ferromagnetic layer 704 are sequentially formed on a gap layer 700 of aluminum oxide. Ni—Fe alloy 20 nm thick is used in the magnetoresistive ferromagnetic layer 704. Though Ni—Fe—Nb alloy 25 nm thick is used in the lateral bias layer 702, any ferromagnetic alloy such as Ni—Fe—Rh and the like may be used if the electric resistance is comparatively high and soft magnetic characteristic is favorable.

The lateral bias layer 702 is magnetized by a magnetic field formed by a sense current flowing through the magnetoresistive ferromagnetic layer 704 in the film in-plane direction (lateral direction) vertical to the current, and lateral bias magnetic field is applied to the magnetoresistive ferromagnetic layer 704. Thus, selected is a magnetic sensor showing the linear reproduction output to the leakage magnetic field from the medium 61. In the separation layer 703 for preventing effective shunt current of sense current from the magnetoresistive ferromagnetic layer 704, Ta having comparatively high electric resistance is used, and the film thickness is taken as 5 nm.

Both ends of the signal detection area are provided with a taper part 705 worked to be tapered. The taper part 705 is formed by a permanent magnet layer 706 for making the magnetoresistive ferromagnetic layer 704 into single magnetic domain, and a pair of electrodes 606 formed thereon for taking a signal. It is necessary that the permanent magnet layer 706 has large coercive force and the magnetizing direction is not easily changed, and an alloy such as Co—Cr, Co—Cr—Pt or the like is used.

The magnetic storage apparatus shown in FIG. 4 is formed by combining the magnetic recording medium described in the embodiment 1 with the head shown in FIG. 5. As a result, in the floating system in which the magnetic floating height hm is about 48 to 60 nm, when the product Br×t of the thickness (t) of the magnetic layer and the residual flux density Br measured by applying a magnetic field in the relative running direction of the magnetic head to the magnetic recording medium in recording exceeds 9.6 mA (120 gauss micron), satisfactory writing cannot be performed, the overwrite characteristic is deteriorated, and the output especially in the high track recording density area is also lowered.

On the other hand, when Br×t is smaller than 32 mA (40 gauss micron), in some case, it is found that being left at 70° C. for four days, the reproduction output is decreased in some composition or thickness of the recording layer of the medium. Accordingly, the magnetic storage apparatus is constructed so that the product Br×t of the thickness (t) of the magnetic layer and the residual magnetic flux density Br measured by applying a magnetic field in the relative running direction of the magnetic head to the magnetic recording medium in recording mentioned in the magnetic recording medium described in the embodiment 1 ranges from 3.2 mA (40 gauss micron) to 9.6 mA (120 gauss micron) both inclusive.

In the case where the magnetoresistive sensor part of the magnetoresistive head uses a head formed between two shield layers which are spaced from each other at a distance of 0.2 $\mu$m and made of soft magnetic substance, when the maximum track recording density exceeds 250 kFCI, sufficient reproduction output cannot be obtained. When the distance between two shield layers made of soft magnetic substance is below 0.12 $\mu$m, the element cannot be formed easily because of difficulty in process machining. Accordingly, the magnetic storage device is formed by using a head formed between two shield layers which are spaced from each other at a distance ranging from 0.12 $\mu$m to 0.2 $\mu$m both inclusive and made of soft magnetic substance. By the thus constructed magnetic storage apparatus, the recording density equal to or higher than 50 giga bit per 1 $in^2$ can be realized.

<Embodiment 3>

A magnetic storage apparatus is formed by the same constitution as that of FIG. 4 except that instead of the magnetoresistive head used in the embodiment 2, the magnetoresistive head 63 described in the embodiment 2 uses a magnetic head formed by a magnetoresistive sensor including plural conductive magnetic layers which cause a large resistance change due to a relative change in mutual magnetizing directions by an external magnetic field and a conductive non-magnetic layer disposed between the conductive magnetic layers.

Figure 7:
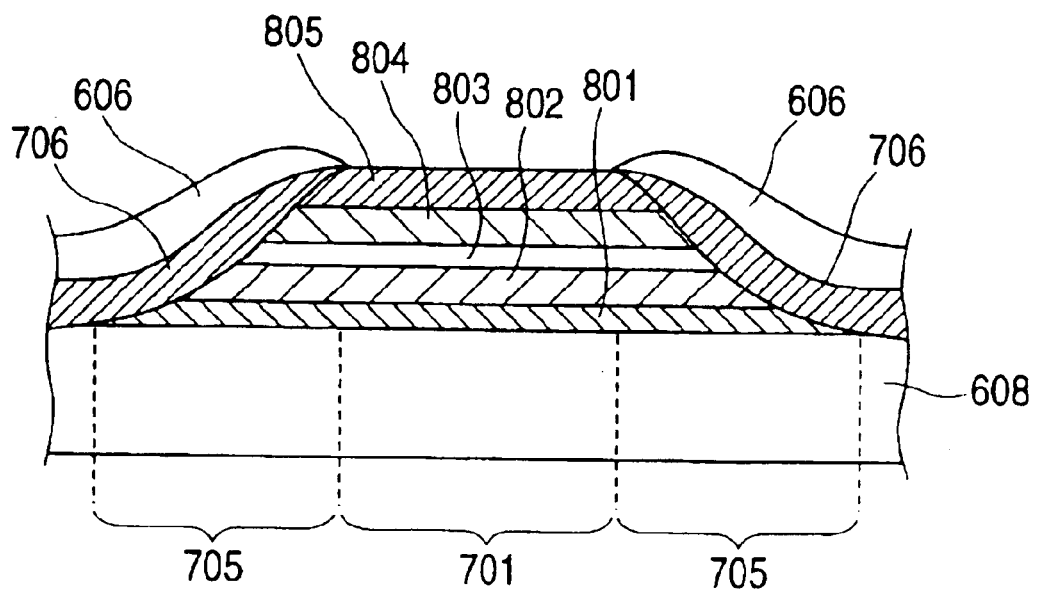
FIG. 7 is a sectional view of a sensor using a spin valve head.

FIG. 7 shows the sectional view of the used sensor. The sensor has a structure in which a Ta buffer layer 801 5 nm thick, a first magnetic layer 802 with a thickness of 7 nm, an intermediate layer 803 made of copper 1.5 nm thick, a second magnetic layer 804 3 nm thick, and a Fe-50 at. % Mn antiferromagnetic alloy layer 805 10 nm thick are sequentially formed on a gap layer 608. In the first magnetic layer 802, Ni-20 at. % Fe alloy is used, and in the second magnetic layer 804, cobalt is used.

By exchange magnetic field from the antiferromagnetic layer 805, the magnetization of the second magnetic layer 804 is fixed in one direction. On the contrary, the direction of the first magnetic layer 802 which is in contact with the second magnetic layer 804 by intercalating the non-magnetic layer 803 is varied by the leakage magnetic field from the magnetic recording medium 61 so that the resistance change is caused.

Such resistance change caused by a change in the relative direction of magnetization of two magnetic layers is called spin valve effect. In the present embodiment, a spin valve head utilizing the effect for the reproducing head is used. The taper part 705 has the same constitution as that of the magnetic sensor of the embodiment 2.

The Brxt of the magnetic recording medium used in measurement is taken as 3, 3.2, 4, 6, 8, 10, 12, and 14 mA. In the case where Brxt is taken as 3 mA (37.5 gauss micron), lowering of a reproducing signal caused with the passage of time is extreme, and it is difficult to obtain practically favorable coercive force. When Brxt exceeds 12 mA (150 gauss micron), though the output of 2F is large, the tendency of lowering the output resolution becomes remarkable so that it is not favorable.

When such a spin valve reproducing head is used, as described in the embodiment 2, a signal recorded at the maximum track recording density exceeding 360 kFCI is stably reproduced to obtain signal output.

The head shown in here is the same as the head used in the embodiment 2, and the magnetoresistive head is formed on the magnetic head slider constructed so that the area of the floating surface rail is equal to or smaller than 1.4 mm$^2$ and the mass is equal to or less than 2 mg. Setting the area of the floating surface rail equal to or smaller than 1.4 mm$^2$ reduces the probability of colliding with the projection, and simultaneously setting the mass equal to or less than 2 mg can improve shock resistance reliability. Thus, high recording density and high shock resistance can be reconciled, and the average failure time interval (MTBF) equal to or longer than 30,0000 hours at the recording density equal to or higher than 50 giga bit per 1 in$^2$ can be realized.

According to the invention, the bonding performance between the protective coating and the lubricating film can be reinforced. Furthermore, a mass-stored and high reliability magnetic disc apparatus can be provided by combining the magnetic recording medium with the magnetic head.

What is claimed is:

1. A magnetic recording medium, the magnetic recording medium having a magnetic film on a non-magnetic substrate by intercalating at least an under layer, the proportion of surface functional groups per 100 carbon atoms in a diamond-like carbon protective coating mainly composed of carbon and further including Nitrogen atoms for protecting the magnetic film is between 23% and 38%, inclusive;

wherein a lubricating film of perfluoroether having at least one additional functional group is provided on the protective coating, wherein the surface functional groups include —COOH, —C=O, —COH, and —CNH$_2$, and mixtures thereof.

2. The magnetic recording medium according to claim 1, wherein the functional group in said diamond-like carbon is identified by a tag modification method using molecules which have functional groups interacting with the protective coating surface functional groups quantitatively and irreversibly by molecular recognition, and contain fluorine atoms which have high sensitivity coefficient to ESCA.

3. A magnetic storage apparatus, comprising a magnetic recording medium that in the magnetic recording medium having magnetic film on a non-magnetic substrate by intercalating at least an under layer, a proportion of surface functional groups per 100 carbon atoms in a diamond-like carbon protective coating mainly composed of carbon and further including Nitrogen for protecting the magnetic film is between 23% and 38%, inclusive and a lubricating film of perfluoroether having at least one additional functional group provided on the protective coating, wherein the surface functional groups include —COOH, —C=O, —COH, and —CNH$_2$, and mixtures thereof, a driving part for driving the magnetic recording medium,
a magnetic head having a recording part and a reproducing part,
a recovery reproducing signal processing part for giving and receiving a signal to and from the magnetic head, and a magnetoresistive head as the reproducing part of the magnetic head.

4. A magnetic storage apparatus, comprising a magnetic recording medium having a magnetic film on a non-magnetic substrate by intercalating at least an under layer, a proportion of surface functional groups per 100 carbon atoms in a diamond-like carbon protective coating mainly composed of carbon and further including Nitrogen atoms for protecting the magnetic film is between 23% and 38%, inclusive and a lubricating film of perfluoroether having at least one additional functional group provided on the protective coating, wherein the surface functional groups include —COOH, —C=O, —COH, and —CNH$_2$, and mixtures thereof, a driving part for driving the magnetic recording medium,
a magnetic head having a recording part and a reproducing part,
a recording reproducing signal processing part magnetic head, and a magnetoresistive head as the reproducing part of the magnetic head.

5. A magnetic recording medium, comprising:

a non-magnetic substrate;
a magnetic film;
an under layer mainly composed of Cr and a seed layer, which are provided between said non-magnetic substrate and said magnetic film;
a diamond-like carbon protective layer mainly composed of carbon and further including Nitrogen atoms for protecting the magnetic film; and
a lubricating film of perfluoroether having at least one surface functional group, wherein a proportion of surface functional groups per 100 carbon atoms in said diamond-like carbon protective layer is between 23% and 38%, inclusive, wherein the surface functional groups include —COOH, —C=O, —COH, and —CNH$_2$, and mixtures thereof.

6. A magnetic recording medium according to claim 5, wherein said proportion of functional group is identified by tag modification method using molecules which have functional groups interacting with the protective coating surface functional groups quantitatively and irreversibly by molecular recognition, and contain fluorine atoms which have high sensitivity coefficient to ESCA.

7. A magnetic recording medium, the magnetic recording medium having a magnetic film on a non-magnetic substrate by intercalating at least a seed layer and an under layer, the proportion of surface functional group per 100 carbon atoms in a diamond-like carbon protective layer mainly composed of carbon and further including Nitrogen atoms for protective the magnetic film is between 23% and 38%, inclusive, and a lubricating film of perfluorether having at least one additional functional group, wherein the surface functional groups include —COOH, —C=O, —COH, and —CNH$_2$, and mixtures thereof.

8. A magnetic recording medium according to claim 7, wherein said proportion of functional group is identified by tag method using molecules which have functional groups interacting with the protective coating surface functional groups quantitatively and irreversibly by molecular recognition, and contain fluorine atoms which have high sensitivity coefficient to ESCA.

* * * * *

UNITED STATES PATENT AND TRADEMARK OFFICE
CERTIFICATE OF CORRECTION

| | |
|---|---|
| PATENT NO. | : 6,949,301 B2 |
| APPLICATION NO. | : 09/784952 |
| DATED | : September 27, 2005 |
| INVENTOR(S) | : Toshinori Ono et al. |

Page 1 of 1

It is certified that error appears in the above-identified patent and that said Letters Patent is hereby corrected as shown below:

<u>the Title Page:</u>  Item (75)
Replace the title with the following: --MAGNETIC RECORDING MEDIUM UTILIZING A DLC PROTECTIVE LAYER WITH SURFACE FUNCTIONAL GROUPS, THE MANUFACTURING METHOD AND MAGNETIC RECORDING APPARATUS USING THE SAME --

Column 1, line 1:  Replace the title with the following: -- MAGNETIC RECORDING MEDIUM UTILIZING A DLC PROTECTIVE LAYER WITH SURFACE FUNCTIONAL GROUPS, THE MANUFACTURING METHOD AND MAGNETIC RECORDING APPARATUS USING THE SAME --

Column 11, line 62:  After "Nitrogen" insert --atoms--.

Column 12, line 53-54:  Change "protective" to --protecting--.

Signed and Sealed this

Twenty-ninth Day of August, 2006

JON W. DUDAS
*Director of the United States Patent and Trademark Office*